Feb. 26, 1957 A. ALTMILLER 2,782,812
CHAIN SAW BUCKING DEVICE
Filed May 24, 1954 2 Sheets-Sheet 1
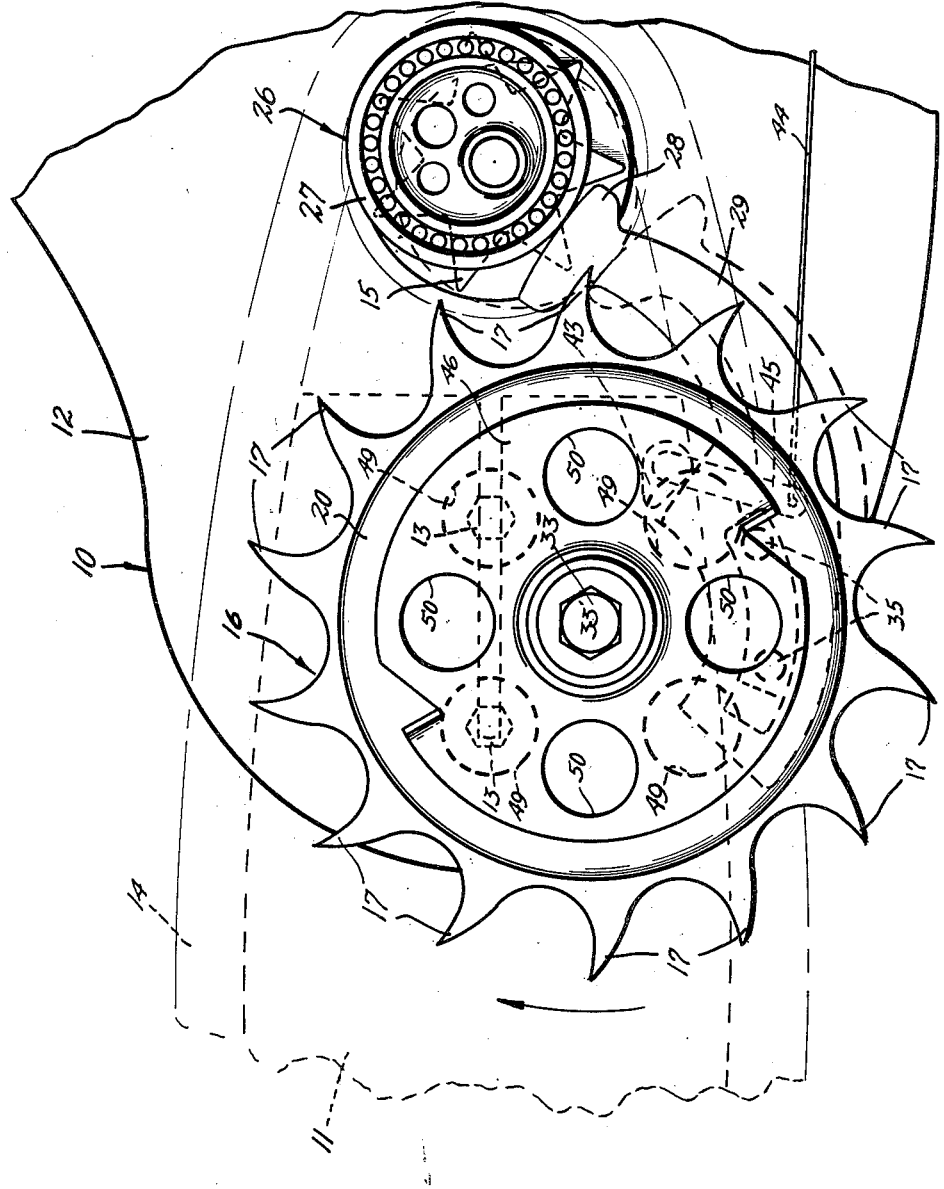
Fig_1
INVENTOR.
Albert Altmiller
BY
Fish and Huff

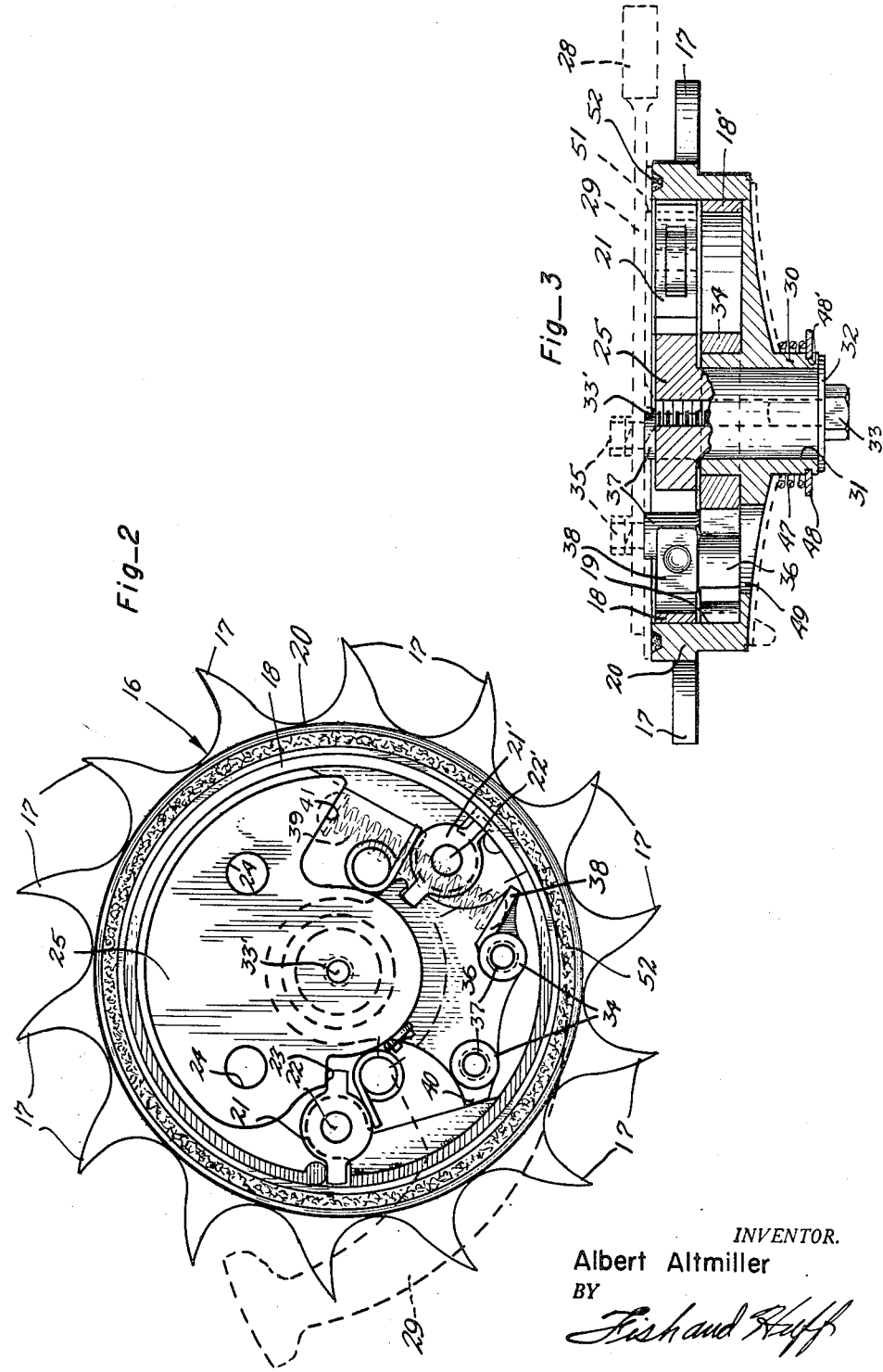

United States Patent Office 2,782,812
Patented Feb. 26, 1957

2,782,812
CHAIN SAW BUCKING DEVICE

Albert Altmiller, Orofino, Idaho

Application May 24, 1954, Serial No. 431,950

8 Claims. (Cl. 143—32)

This invention is an improved bucking anchor for powered chain saws.

One object of the invention lies in the provision of a bucking device for powered chain saws which eliminates the necessity of a sawyer stopping the saw, removing the bucking spikes or claws and replacing them for resetting the saw during crosscut operations on a relatively large log or work piece.

Another object of the invention lies in the provision of an endless series of bucking claws carried by the saw and adapted for unidirectional movement so that the chain saw support bar may be advanced laterally into the work piece but lateral movement away therefrom may be prevented.

Another object of the invention lies in the provision of a powered chain saw having an endless series of bucking claws disposed to anchor the saw to the work piece and being mechanically powered by the saw for advancing the saw laterally into the work piece by rotating the series of bucking claws.

Another object of the invention lies in the provision of a powered chain saw having a powered endless series of bucking claws whereby a log may be cut completely through in less time than with a conventional type saw and bucking mechanism.

Another object of the invention lies in the provision of an endless series of bucking claws journaled upon a chain saw for unidirectional movement and including a pair of overrunning clutch members for controlling movements of the bucking claws.

Another object of the invention lies in the provision of a powered endless series of bucking claws forming an anchor for the saw and adapted to be manually controlled for advancing the saw support bar through the work piece to be cut and one that is assembled from a minimum number of parts and not liable to get out of working condition.

These and other objects of the invention will become apparent during the course of the following description.

In the accompanying drawings, forming a part of this specification, and in which like numerals are employed to designate like parts, Figure 1 is a plan view of the improved bucking mechanism journaled upon a fragmentary portion indicating a powered chain saw;

Figure 2 is a bottom plan view of the bucking mechanism having its cover plate and actuating lever removed for convenience of illustration; and, Figure 3 is a diametric cross section taken through the bucking mechanism and having parts dotted in position.

Referring now more particularly to the drawing, in Figure 1 I employ a fragmentary portion of a chain saw indicated in general by the numeral 10. This portion serves to represent the complete chain saw including the prime mover or motor and transmission, but since these parts are no part of my present invention and are well known in the trade, the details thereof have not been disclosed.

The chain saw is provided with the usual saw support bar 11 which is anchored to the chain saw frame 12 by means of stub bolts 13 and a conventional cutting chain 14 is supplied to travel about the edge of the bar 11 in a conventional manner. The chain saw frame 12 supports a powered drive sprocket 15 which cooperates with the chain 14 at its inner end to provide movement to the chain whereby the work piece (not shown) is cut.

Since it is necessary that considerable pressure be applied to effect proper and adequate cutting by the chain 14 and because chain saws are constructed of materials which are very light to make their manual transportation from place to place as easy as possible, it is necessary to provide mechanism which is conventionally known in the trade as bucking spikes or bucking claws. Conventionally these bucking spikes or claws are rigidly fixed to the frame 12, either by being formed integral with the frame or by mechanically securing them thereto and they are disposed to be thrust into the face of a log or work piece, penetrating to a depth sufficient to anchor the saw and form a fulcrum over which the saw may be tilted for applying cutting pressure or lateral pressure to the cutting chain 14 through the chain saw support bar 11. While cutting the log after the free end of the saw blade has been tilted downwardly to a position where it is not convenient for the sawyer to handle it, it is necessary to withdraw the bucking spikes or claws from the work piece and permit the chain to cut the kerf adjacent to the saw frame 12 whereupon the spikes or claws are again reset and the cutting cycle again started by tilting the free end of the saw support bar into the work piece again. This action continues until the work piece is completely cut off.

In the present invention applicant seeks to eliminate the step in this method of sawing wherein the spikes are removed from the wood piece and reset, thus materially increasing the speed with which a work piece may be cut off.

Again referring to Figure 1, it will be seen that applicant has provided an annular series 16 of bucking claws 17 and this series 16 of claws 17 is journaled on the frame 12 at an axis indicated at 33' for rotational movement in a clockwise direction as viewed in Figure 1, the path of movement of claws 17 being in a plane parallel with the plane of chain saw support bar 11 of the chain saw 10. It will thus be seen that as the saw chain 14 cuts into the work piece the bucking claws 17 may rotate about the journal axis at 33' and permit the saw to lower or have lateral movement into the work piece. Obviously, to cause the series of bucking claws to act as an anchor or fulcrum over which the saw may be tilted it is necessary to prevent counterclockwise rotation of the series of bucking claws 17 as viewed in Figure 1 so that upward pressure on the saw frame 12 will effect downward tilting movement of the chain saw support bar 11 thus effectively forcing the chain saw 14 into the work piece for cutting.

Means is provided to limit rotational movement of the series of bucking claws 17 to one direction only (clockwise in Figure 1 and counterclockwise in Figure 2) and this means is shown to include an expansible brake band disposed to frictionally engage and disengage with relation to a cylindrical inner face 19 formed in the housing 20 which supports the annular series 16 of bucking claws 17. The brake band 18 is provided at one end with a lever mechanism 21 adapted to apply expansion pressure to the brake band 18 when pressure is applied to the bucking claws 17 in a direction urging the rotation of the series of bucking claws in a clockwise direction as seen in Figure 2. The lever mechanism 21 is pivoted midway its length at 22 to one end of the band 18 and has one of its ends disposed to apply expanding pressure to the opposed end of the brake band 18. At its opposed end the lever of mechanism 21 is in contact with a shoulder 23 which is fixed relative to the frame 12 of the chain saw by bolts 13 which pass through the apertures 24 formed in anchor plate 25 upon which the shoulder 23 is formed. It will thus be seen that any clockwise pressure applied to the teeth 17 or housing 20 as viewed in Figure 2 will cause the brake band 18 to expand and lock the housing against rotational movement.

The construction thus far described is sufficient to provide a suitable, inexpensive bucking mechanism which will permit lateral movement of the chain saw into the work piece without withdrawing the chain saw to remove the claws from the work piece. This is accomplished by rolling the series of bucking claws over the periphery of the work piece and yet its unidirectional journal mounting will provide for its being used as a fulcrum point over which the saw support bar 11 may be tilted downwardly into the work piece.

To further increase the usefulness of the present invention I provide power means for rotating the annular series 16 of bucking claws 17 whereby a minimal portion of the power supplied to the saw chain 14 is employed for rotating the housing 20 in its direction of rotation and thus using power for advancing the saw support bar 11 laterally into the work piece.

Observing Figure 1 it will be seen that I have supplied on the powered drive sprocket 15 an eccentric cam 26. As indicated, the cam 26 is provided with a roller bearing rim 27 which is adapted to bear against a cam follower 28 carried on the end of actuating lever 29, which lever 29 is adapted to rotate the housing 20 in successive short pulsating movements.

Referring now more particularly to Figure 3 it will be seen that the housing 20 is provided with an axially extending sleeve 30 at its axis. The sleeve 30 rotatably receives an annular stem 31 which is carried by the anchor plate 25. At its axis the stem 31 is drilled and tapped and on its free outer end the stem 31 is provided with a washer 32 which is secured by means of a bolt 33 which identifies the journal axis 33'. It will thus be seen that the housing is rotatably carried by the stem 31 and anchored against accidental removal therefrom by means of washer 32 and stud bolt 33.

The sleeve 30 extends inwardly of the housing a distance sufficient to form a journal about which a ring 34 is rotatably carried. Inspection of Figure 3 will reveal that the ring 34 is provided with an extension portion 36 which supports inwardly extending spaced bosses 37 into which the bolts 35 are threaded and secure the actuating lever 29 thereto.

It is obvious from inspection of Figure 1 that as the powered drive sprocket 15 rotates, the cam 26 will cause actuating lever 29 to move, as indicated in Figure 1 from the solid to the broken line positions once for each revolution of the drive sprocket 15 and therefore the ring 34 and its extension 36 will be caused to oscillate to a limited degree about the axis 33'.

The extension 36 of ring 34 is also provided with a bearing plate 38 which supports one end of expansion spring 39 having its other end bearing upon the anchor plate 25 and the tension of spring 39 attempts to rotate the ring 34 about the axis 33' but the extension 36 is provided with a stop 40 which bears against a portion of the brake band 18 and limits its rotational movement about axis 33' away from the spring support face 41 of plate 25.

The ring 34 and its component parts are provided with a second expansion brake band 18' which is disposed within the housing 20 and adapted to frictionally engage the cylindrical face 19 of the housing 20 when clockwise rotational movement is applied to the ring 34 as viewed in Figure 1 or counterclockwise rotational movement as viewed in Figure 2. It will thus be seen that as the cam 26 rotates and actuates lever 29 counterclockwise rotation is applied to the ring 34 as viewed in Figure 2, causing the brake band 18' through the mechanism 21', as previously described for brake band 18, to frictionally grasp the housing 20 and causes it to rotate a distance commensurate with the movement of the actuating lever 29. As the cam 26 continues its movement and the rim 27 recedes from the lever 29 the spring 39 causes the ring 34 to be shifted again to its normal position disclosed in Figure 2 and subsequent pressure applied by cam 26 will cause a further subsequent movement of the housing 20.

The looped springs 42 and 43 are provided to apply minimal pressure to the bands 18 and 18' to insure their frictional engagement with the cylindrical face 19 when desired. It will be understood however that if sufficient pressure of expansion is formed as an inherent quality of the brake bands 18 and 18' springs 42 and 43 may be omitted.

Since it is not always desirable to have the same speed of advancing the saw by rotation of the series of bucking claws, it is necessary that means be provided to vary the speed of rotation of housing 20. To accomplish this I provide a cam 43 pivotally carried by the frame 12 and actuated by means of a flexible cable 44 secured to a bell crank lever 45. It will thus be seen that the movement of the actuating lever 29 toward the cam 26 may be manually controlled by actuating flexible cable 44 and the movement of housing 20 will be commensurate with the actual movement of lever 29 toward and away from the cam 26. When the actuating arm 29 is held out of contact with cam 26 no movement is imparted to the housing 20. The flexible cable 44 may lead to a convenient spot on one handle (not shown) of the chain saw 10 so that the operator may control the speed of rotational movement of the series of bucking claws 17 by a finger or otherwise.

To preclude sawdust, dirt, and other debris from entering the mechanism I provide a spring pressed cover 46 rotatable about the axis 33' and encircling the sleeve 30. The cover is secured against accidental rotation by means of a tension spring 47 confined by a ring 48 confined in an annular groove 48' formed at the outer free end of the sleeve 30. It will be noted that the housing 20 is provided with four apertures 49 spaced ninety degrees about a circle from each other so that two of them may be disposed over the bolts 13 and the bolts 13 may be removed or applied therethrough. The cover plate 46 is provided with apertures 50 spaced to be aligned with each aperture 49 and also to be disposed intermediate the apertures when in the closed position.

On its inner side the mechanism is provided with a cover plate 51 which has an aperture through which the bosses 37 extend permitting the actuating lever 29 to be secured thereto. An annular groove is supplied with packing at 52 to permit the housing 20 to rotate while the cover plate 51 is secured with the bolts 13 and thus the bucking mechanism is sealed against being contaminated by dust, dirt, or sawdust.

While there are above disclosed but a limited number of embodiments of the structure, process and product of the invention herein presented, it is possible to produce still other embodiments without departing from the inventive concept herein disclosed and it is desired therefore, that only such limitations be imposed on the appended claims as are stated therein, or required by the prior art.

Having thus described my invention, I claim:

1. In a powered chain saw having an endless series of claws disposed to continuously engage a work piece during movement of the saw therethrough and forming a bucking device, the improvement which comprises means mounting the series of claws for unidirectional movement about a path substantially parallel to the plane of the chain saw support bar and in a direction opposed to the movement of the saw chain, and manually controlled powered means operably connected to effect movement of said claws according to manual selection.

2. In a powered chain saw having an endless series of claws disposed to continuously engage a work piece during movement of the saw therethrough and forming a bucking device, the improvement which comprises means mounting the series of claws for unidirectional movement about a path substantially parallel to the plane of the chain saw support bar and in a direction opposed to the movement of the saw chain, powered means including a prime mover operably connected to actuate the series of claws for movement about said path, and manually controlled means for selectively actuating movement of said claws and regulating the speed of said movement.

3. The combination with a powered chain saw having a powered drive sprocket, a rigid chain saw support blade and an endless saw chain trained about said sprocket and said chain saw support bar, of a bucking mechanism carried by the saw and having an endless series of bucking claws disposed to anchor the saw to the work piece being sawn continuously during its sawing action and against lateral movement away therefrom, said series of bucking claws being journaled for rotational movement on an axis parallel to the axis of said drive sprocket, a unidirectional clutch mechanism operably connected intermediate said saw and said series of claws for limiting rotational movement of said claws to one direction the movement being such that the saw blade may be advanced laterally into the work piece, but lateral movement away therefrom is precluded, and motion transmitting mechanism operably connected intermediate the power sprocket and the series of bucking claws for providing power means for rotating said series of claws.

4. The invention as defined in claim 3 wherein the powered sprocket is provided with an eccentric cam, and a lever actuated by said cam is operably connected to said unidirectional clutch mechanism for driving said series of bucking claws.

5. The combination with a powered chain saw having a powered sprocket, a substantially rigid saw chain support blade extending radially from said sprocket, and a saw chain trained about said chain sprocket and saw support bar, of a powered bucking mechanism carried by the saw and comprising an annular housing journaled on the saw for rotation in a plane parallel to the saw support bar of asid saw and having an internal cylindrical face, an endless series of external bucking claws carried by the annular housing and disposed to penetrate the surface of a work piece being sawn and form an anchor, an overrunning clutch cooperating with the cylindrical face in said housing and rigidly secured to said saw whereby the housing is limited to rotation in one direction only, a second overrunning clutch cooperating with the cylindrical face of said housing and adapted to rotate said housing in the direction permitted by said first named clutch, and power transmission means operably connected to drive said second named clutch for rotating said housing, said power transmission means being actuated by the rotational movement of said drive sprocket.

6. The invention as defined in claim 5 where said overrunning clutches comprise expandable brake bands adapted to frictionally engage said cylindrical face.

7. The combination with a powered chain saw having a prime mover, of a bucking device secured to the saw and having an endless series of work piece engaging claws for anchoring the saw to a work piece to provide a fulcrum over which the chain saw may be tilted into the work piece, a unidirectional clutch mechanism operably connected intermediate said saw and said series of claws for limiting movement of said claws in one direction to effect movement of the chain saw laterally into the work piece and preclude lateral movement away therefrom; and motion transmitting mechanism operably connected intermediate said prime mover and said series of work piece engaging claws for rotating said series of claws.

8. The invention as defined in claim 7 wherein the motion transmitting mechanism is adapted for selectively varying the speed of movement of said series of work piece engaging claws.

References Cited in the file of this patent
UNITED STATES PATENTS

| | | |
|---|---|---|
| 1,539,818 | Arsneau | June 2, 1925 |
| 2,572,405 | Stone et al. | Oct. 23, 1951 |